United States Patent [19]

Blankenburg

[11] Patent Number: 5,752,635
[45] Date of Patent: May 19, 1998

[54] VEHICLE ARTICLE CARRIER

[76] Inventor: Karl Blankenburg, 32131 Claeys Dr., Warren, Mich. 48093

[21] Appl. No.: 556,228

[22] Filed: Nov. 9, 1995

[51] Int. Cl.[6] ............................................. B60R 9/045
[52] U.S. Cl. ............................................. 224/321; 211/209
[58] Field of Search ............................... 224/321, 316, 224/325; 211/175, 207, 209

[56] References Cited

U.S. PATENT DOCUMENTS

| | | | |
|---|---|---|---|
| 1,062,556 | 5/1913 | Smith | 211/209 X |
| 3,545,660 | 12/1970 | Stephen. | |
| 4,180,010 | 12/1979 | McDermott et al. | 224/321 X |
| 4,294,388 | 10/1981 | Wünstel. | |
| 5,190,198 | 3/1993 | Cucheran | 224/321 |

FOREIGN PATENT DOCUMENTS

WO9410007  5/1994  WIPO ................ 224/321

*Primary Examiner*—Renee S. Luebke
*Attorney, Agent, or Firm*—Young & Basile, PC

[57] ABSTRACT

A vehicle article carrier having at least one lateral cross rail selectively positionable along a pair of longitudinally extending side rails. A drive member in the form of a loop is movably mounted about rotatable members at opposite ends of each side rail. A shuttle cleat is slidably mounted in each side rail and coupled to the drive member in each side rail. An output shaft of a electric drive motor is coupled to at least one of the rotatable members for adjustably positioning the movable cross rail along the side rails. Alternately, a separate electric drive motor rotates one rotatable member in each side rail. In an alternate embodiment, a toothed rack or a series of spaced apertures is carried in each side rail and engaged by complementary shaped toothed rotatable members mounted at opposite ends of the movable cross rail. A rotatable crank or power tool engagable with at least one of the toothed rotatable members imparts rotation to the rotatable member to reposition the movable cross rail along the side rails.

21 Claims, 8 Drawing Sheets

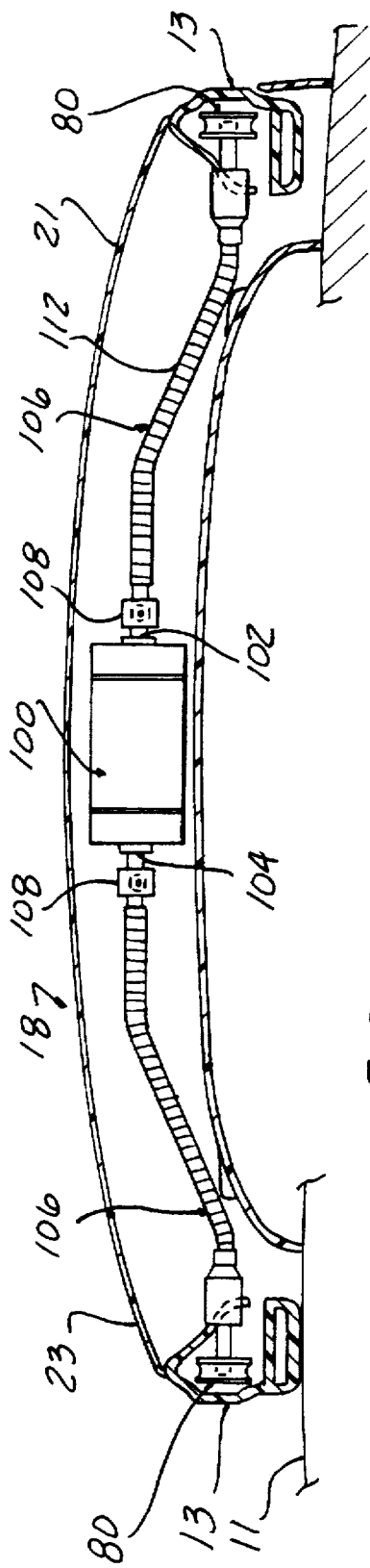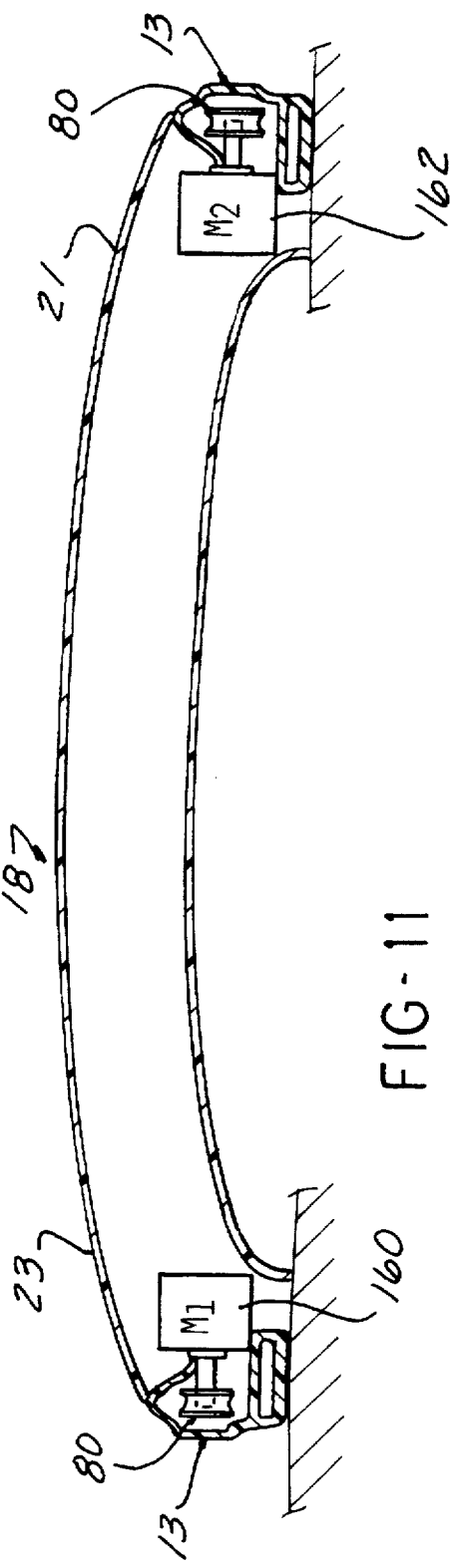
FIG-5
FIG-11

VEHICLE ARTICLE CARRIER

BACKGROUND OF THE INVENTION

1. Field of the Invention

The present invention relates to article carriers for vehicles.

2. Description of the Art

A variety of different article or cargo carriers have been devised to transport articles or cargo on the exterior surfaces of vehicles, such as on the roof or trunk of an automotive vehicle. Such carriers typically include a pair of side rails fixed to and extending longitudinally of the vehicle exterior panel. At least a pair of cross rails are connected to and extend laterally between the side rails for supporting a load on the article carrier and to provide convenient tie-down of the load or cargo. Such cross rails are typically supported above the vehicle exterior surface by stanchions mounted on opposite ends of each cross rail which slidably engage the side rails.

In order to facilitate the transport of different sized loads or cargo, slidable and even removable cross rails have been provided in vehicle article carriers. At least one and, frequently, all of the cross rails on a vehicle article carrier are provided with stanchions which slide within or on a side rail and include a releasable latch which engages the side rail in one of a number of discrete positions or at any variably selected position along the length of the side rail. Such latch mechanisms are mounted in each stanchion and include rotatable knobs, cam levers, clamps and pivotal hooks which releasibly engage a side rail.

In order to reposition a movable cross rail, after the latch has been released, a user will grasp the cross rail, typically adjacent one end or stanchion, and then forcibly urge the cross rail longitudinally along the vehicle roof to the desired position before re-engaging the latch or latches. During such movement, it is difficult for a single person to move the cross rail squarely along the side rails when only exerting force on the cross rail from one side of the vehicle which impedes the smooth sliding movement of the cross rail.

Thus, it would be desirable to provide a vehicle article carrier with a movable cross rail which ensures that the movable cross rail remains perpendicular to the side rails during all longitudinal movement of the cross rail along the side rails. It would also be desirable to provide a vehicle article carrier with a movable cross rail in which the movable cross rail may be adjustably repositioned by a powered drive mechanism.

SUMMARY OF THE INVENTION

The present invention is a vehicle article carrier which provides adjustable positioning of a movable cross rail along a pair of spaced side rails while maintaining the movable cross rail in substantial perpendicularity to the side rails.

In one embodiment, the vehicle article carrier includes a pair of spaced side rails mounted on and extending longitudinally along a vehicle body surface. A movable cross rail is slidably mounted on and extends between the side rails and is movably positionable along the side rails. Means are mounted in the side rails and coupled to the movable cross rail for longitudinally adjusting the position of the movable cross rail along the side rails while maintaining the movable cross rail substantially perpendicular to the side rails.

In one embodiment, a pair of rotatable members are mounted in each side rail. A drive member movably extends between a pair of the rotatable members in each side rail. A shuttle cleat is slidably mounted within each side rail. Means are provided for coupling the drive member in each side rail to the shuttle cleat. Means are also provided for rotating one rotatable member in each of the side rails in unison with one rotatable member in the other side rail to bidirectionally move the drive members and resulting in adjustable positioning of the movable cross bar along the side rails.

In a preferred embodiment, flexible connectors or shafts are connected to the output shaft or shafts of a drive motor mounted in a cross rail stationarily mounted to the side rails and to one rotatable member in each side rail to provide rotative power to the rotatable members for powering the repositioning of the movable cross rail along the side rails. Alternately, a manually rotative crank may be engaged with at least one of the rotatable members to impart rotation to the rotatable member and the drive member to reposition the movable cross rail.

The drive member may be in the form of a chain formed of a plurality of balls interconnected by stems. Alternately, the drive member may be in the form of an apertured belt which is engaged by projections on the shuttle cleat and in the rotatable members.

In another embodiment, an electric drive motor is coupled to one rotatable member in each side rail. The drive motors are activated simultaneously to equally rotate the rotatable members to adjust the position of the movable cross rail along the side rails while maintaining the movable cross rail substantially perpendicular to the side rails during all position adjustment moves.

In another embodiment, the vehicle article carrier has a pair of spaced side rails mounted on and extending longitudinally along a vehicle body surface. A movable cross rail is slidably mounted on the side rails and is movably positionable along the side rails. A plurality of longitudinally spaced teeth are formed in each side rail. A pair of toothed rotatable members are rotatably carried at opposite ends of the movable cross rail and engaged the teeth in each side rail. The toothed rotatable members are coupled together by a shaft. Means are connectible to at least one of the pair of toothed rotatable members for imparting rotation to the at least one rotatable member and thereby to the movable cross rail and the opposed tooth rotatable member whereby rotation of the tooth rotatable members along the teeth in each side rail causes movement of the movable cross rail along the side rails. Alternately, spaced apertures are formed in each side rail and are engaged by complementary shaped projections on the rotatable members carried by the movable cross rail.

In yet another embodiment, a vehicle article carrier includes a pair of spaced side rails mounted on and extending longitudinally along a vehicle body surface. An interior cavity extending longitudinally through each side rail. A movable cross rail is slidably mounted on and extends between the pair of side rails. Guide members are mounted at opposite ends of the movable cross rails. A first cable having first and second opposed ends and a second cable also having first and second opposed ends are disposed in the side rails and the movable cross rails. The first cable is connected at a first end to one end of one side wall and passes about the guide members in the movable cross rail to a fixed connection at the second end to a diagonally opposed end of the other side rail. The second cable is connected at a first end to one end of the other side rail and passes about the guide members in the movable cross rail to a fixed connection at a second end to a diagonally opposed end of the one side rail.

The vehicle article carrier of the present invention provides adjustable repositioning of a movable cross rail along a pair of the side rails while maintaining the ends of the movable cross rail substantially perpendicular to the side rails for easy sliding movement of the movable cross rail. The drive motor powered embodiment also uniquely repositions the movable cross rail without user force on the cross rail and, further, provides an automatic locking of the cross rail in a selected position when the motor is deactivated.

BRIEF DESCRIPTION OF THE DRAWING

The various features, advantages and other uses of the present invention will become more apparent by referring to the following detailed description and drawing in which:

FIG. 5 is a cross sectional view, generally taken along line 5—5 in FIG. 1, and showing the power drive means mounted in the stationary cross rail shown in FIG. 1;

FIG. 11 is a cross sectional view generally taken along line 5—5 in FIG. 1, but depicting another embodiment of the article carrier.

DESCRIPTION OF THE PREFERRED EMBODIMENTS

Figure 1:
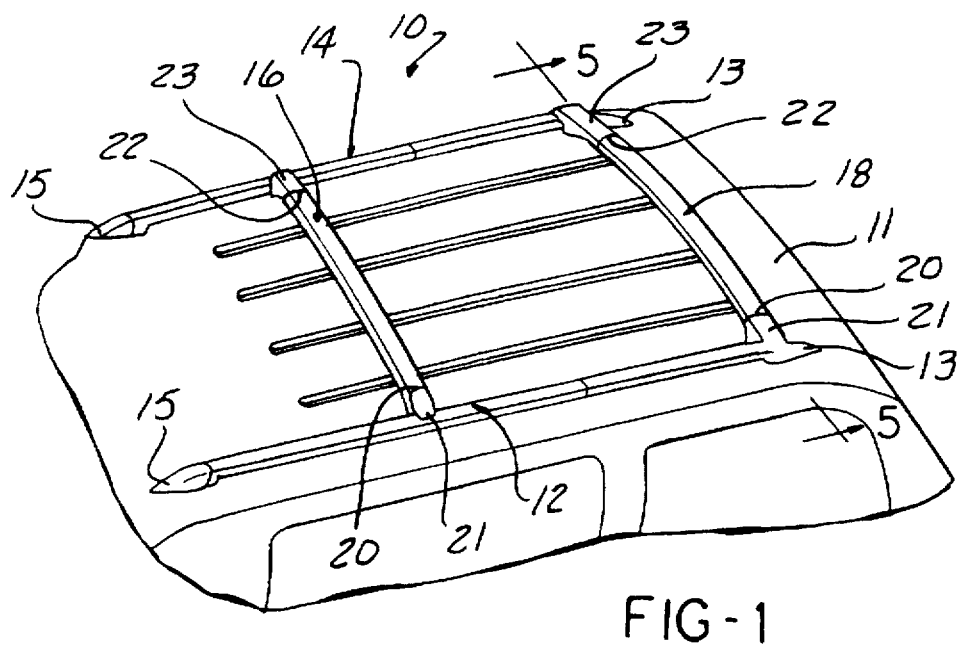
FIG. 1 is a perspective view of an article carrier constructed in accordance with a first embodiment of the present invention.

Referring now to the drawing there are illustrated various embodiments of an article carrier which is adapted for carrying articles or cargo on an exterior body panel of a vehicle.

As shown in FIG. 1, the article carrier 10 is mounted on a substantially horizontally extending vehicle exterior surface panel 11, such as a roof panel, of a vehicle. Alternately, the article carrier 10 could be mounted on a trunk of an automobile. Such panels 11 are substantially horizontal in orientation and generally planar in shape, except that such body panels may have a slight bow from a longitudinal center line to the outer side edges thereof.

In general, the article carrier 10 includes a pair of side rails denoted generally by reference numbers 12 and 14 which are laterally spaced on the exterior body panel 11 and extend longitudinally along the length of the exterior body panel 11. The side rails 12 and 14, which are substantially identical, although typically formed as mirror images of each other, may be formed of any suitable material for carrying articles, such as metal, plastic and combinations thereof. The side rails 12 and 14 are fixed to the vehicle exterior panel 11 by suitable means, such as fasteners, adhesive, etc., not shown. Further, the side rails 12 and 14 may have any suitable shape, with the shape described and illustrated herein being by way of example only. Such shapes may provide aerodynamic qualities as well as serving an aesthetic purpose. In the embodiments shown in FIGS. 1–8, the side rails 12 and 14 have a multi-ribbed cross-section along their longitudinal length.

Figure 2:
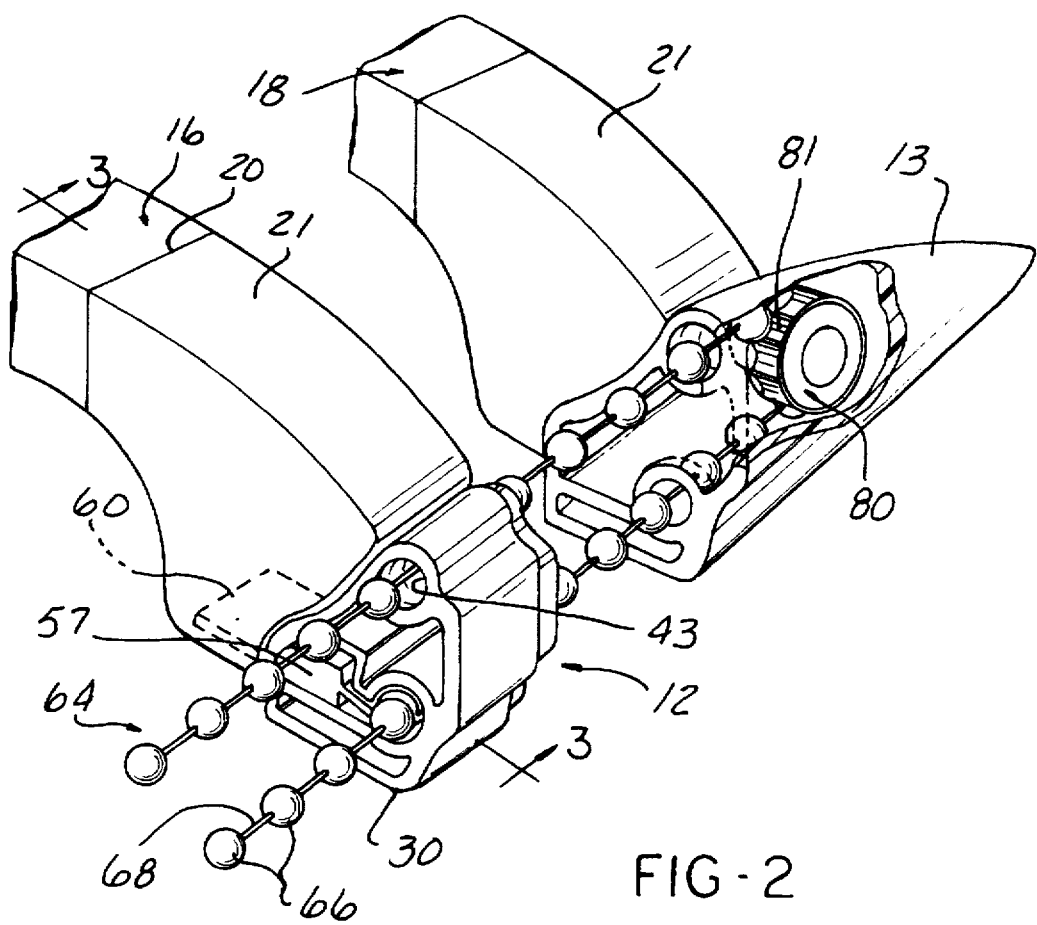
FIG. 2 is an exploded, partial, perspective view showing the means for adjusting the position of the movable cross rail along the side rail of the first embodiment shown in FIG. 1.
Figure 4:
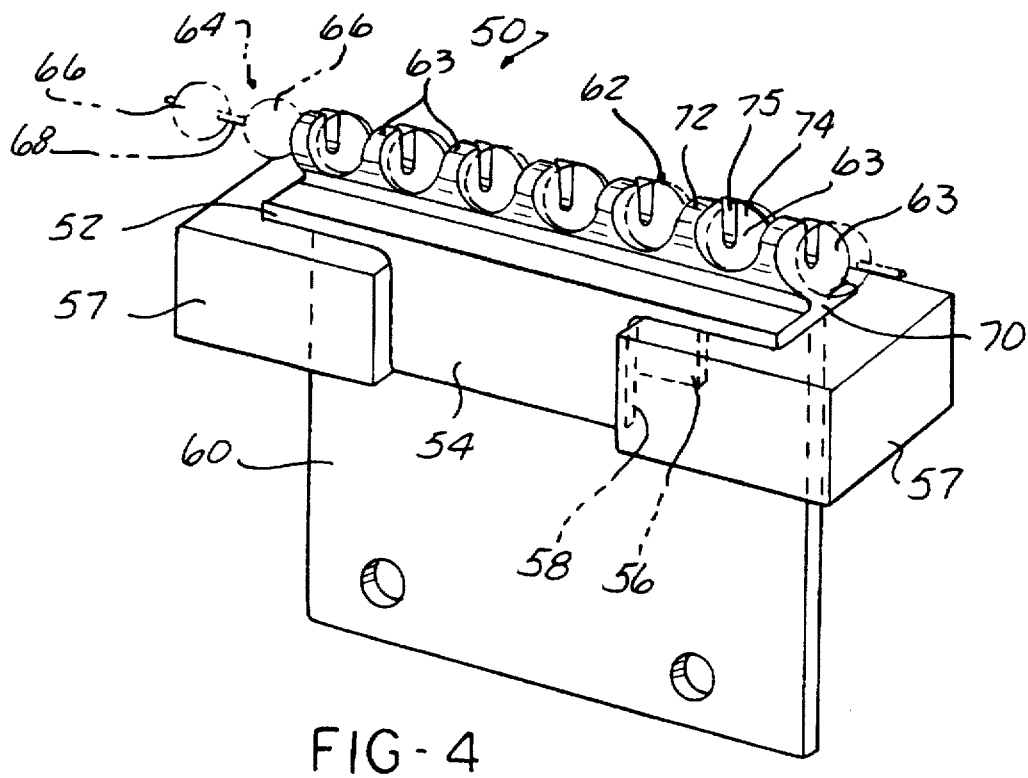
FIG. 4 is a perspective view of the shuttle cleat employed in the first embodiment of the invention.

In a specific embodiment shown in FIGS. 2, 4 and 5, each of the side rails 12 and 14 has a lower surface 30 disposed in registry with the surface of the vehicle exterior body panel 11. The side rails 12 and 14 may have various aerodynamic and aesthetic shapes extended from the lower surface 30. A slot 34 extends longitudinally along the inner side of each side rail 12 and 14. A pair of spaced lateral ribs 35 and 37 extend between the inner and outer sides of each side rail 12 and 14. A slot 39 is formed at one end of the ribs 35 and 37 and opens to a circular cross section bore 41. A similar circular cross section bore 43 is formed at an upper portion of each side rail 12 and 14.

End caps 13 and 15 are mounted to opposite ends of each side rail 12 and 14, respectively, to close the ends of the side rails 12 and 14. Each of the side rails 12 and 14, in this exemplary embodiment, is formed of two sections, each integrally formed with one of the end caps 13 and 15. Alternately, the end caps 13 and 15 may be joined to opposite ends of each side rail 12 and 14 by interfitting tongue and groove connections. Suitable fasteners, adhesives, etc., not shown, may also be employed to fixedly interconnect the side rails 12 and 14 to the end caps 13 and 15.

The article carrier 10 includes at least two cross rails 16 and 18, at least one of which is movable longitudinally along the side rails 12 and 14. As shown in the embodiment depicted in FIG. 1, the cross rail 16 is movable longitudinally along the side rails 12 and 14; while the cross rail 18 is stationarily mounted to one end of the side rails 12 and 14.

The cross rails 16 and 18 extend laterally between the side rails 12 and 14 and are formed with any exterior shape, such as, for example, a shape providing aerodynamic and aesthetic qualities. Further, the cross rails 16 and 18 may be formed of any suitable metal, plastic, or combinations thereof, and may be hollow or solid, as desired.

Each of the cross rails, such as cross rail 16, has opposed lateral ends 20 and 22. Separate stanchions 21 and 23 are attached to each end 20 and 22 of the cross rail 16. The stanchions 21 and 23 serve to slidably mount or connect the cross rail 16 to the side rails 12 and 14 as well as to support the cross rail 16 above the vehicle exterior surface 11.

By example, one pair of stanchions 21 and 23 are integrally formed as part of each end cap 13. The stanchions 21 and 23 connected to the movable cross rail 16 are slidably disposed on the side rails 12 and 14, respectively. Alternately, the stanchions 21 and 23 can be separate elements slidably mounted on the side rails 12 and 14, in the case of cross rail 16 or fixedly attached to the side rails 12 and 14 for the cross rail 18.

Figure 3:
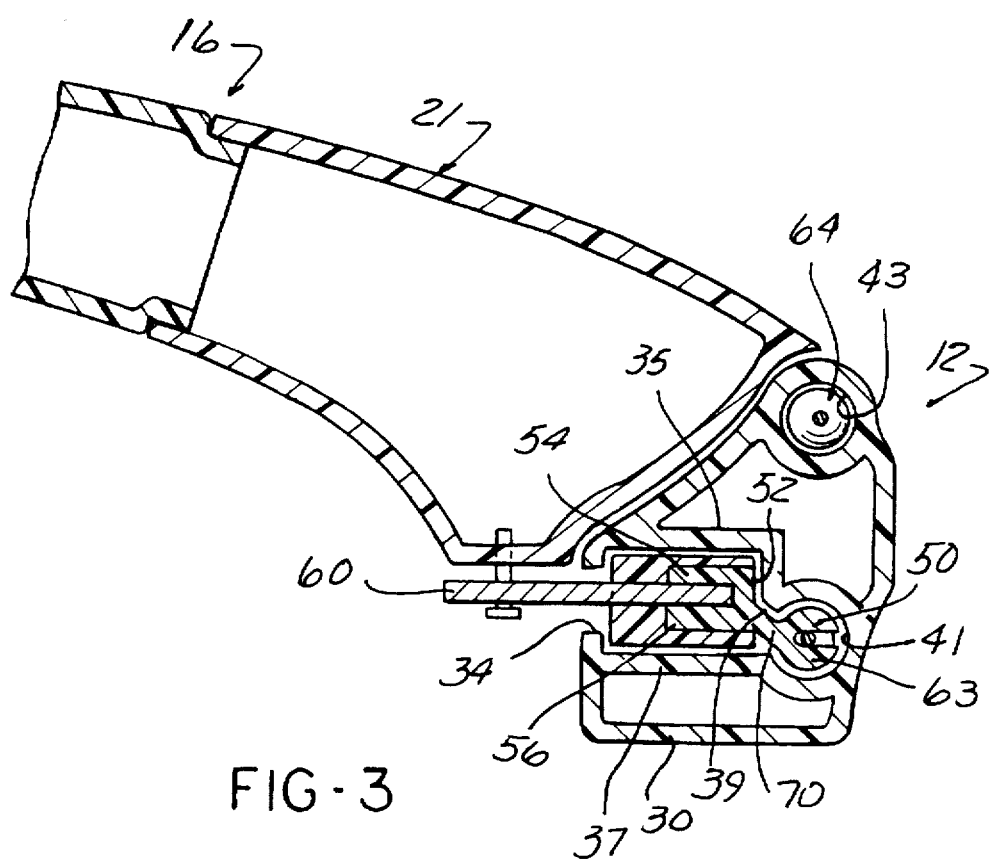
FIG. 3 is a cross sectional view generally taken along line 3—3 in FIG. 2.

A shuttle cleat 50, shown in detail in FIGS. 3 and 4, is slidably mounted in each side rail 12 and 14. The shuttle cleat 50 has an elongated base 52 from which a pair of spaced legs 54 and 56 extend. A notch 58 is formed between the spaced legs 54 and 56. The notch 58 receives one end of a mounting member 60 which is preferably in the form of a metal plate. The opposite end of the mounting member 60 is likewise securely connected to the stanchion 21 as shown in FIG. 3, by suitable fasteners.

As shown in FIG. 4, the side ends of the mounting member 60 extend outward beyond the opposite ends of the legs 54 and 56 of the shuttle cleat 50. A pair of tabs 57 are mounted, preferably by heat staking, on the outer ends of the mounting member 60 and substantially fill the cavity between the ribs 35 and 37 in the side rail 12 or 14 as shown in FIG. 3. The tabs 57 are spaced a short distance from the ends of the legs 54 and 56 on the shuttle cleat 50 to loosely couple one end of the mounting member 60 to the shuttle cleat 50 while providing a small amount of play between the shuttle cleat 50 and the mounting member 60.

As described hereafter, a drive member denoted generally by reference number 64, in one embodiment, is in the form of a chain formed in a continuous loop. The chain 64 is formed of a plurality of spherical balls 66 interconnected by stems 68 which are connected at one end to one ball 66 and at one opposite end to an adjacent ball 66 in a conventional manner.

Drive member engaging means denoted generally by reference number 62 in FIG. 4 is formed on and extends outward from an opposite side of the base 50 of the shuttle cleat 50. The drive member engaging means 62 is in the form of a plurality of longitudinally spaced fork members 63 integrally formed on or securely mounted on the base 52 of the shuttle cleat 50. Each fork 63 includes a stem 70 from which a pair of spaced legs 72 and 74 extend. The legs 72 and 74 are spaced apart by a narrow slot 75 sized to receive the stem 68 of the chain or drive member 64 therein. In this engaged position, two adjacent balls 66 of the chain 64 are disposed immediately adjacent opposed surfaces of each fork 63 with the stem 68 disposed in the slot 75 in the fork 63, as shown in FIGS. 3 and 4, to attach the shuttle cleat 50 to the drive member 64.

Since the mounting member 60 is fixedly connected to the stanchion 21 on the movable cross rail 16 and is coupled to the drive member or chain 64 by the shuttle cleat 50, as shown in FIGS. 2, 3 and 4, bidirectional movement of the drive member or chain 64, as described hereafter, results in bidirectional sliding movement of the shuttle cleat 50 and thereby the movable cross rail 16.

The drive means of the vehicle article carrier 10 includes the above-described drive member or chain 64. In addition, a rotatable wheel or pulley 80, as shown in FIG. 2, is rotatably mounted in each end cap 13 and 15 at opposite ends of each of the side rails 12 and 14. The wheel 80 includes circumferentially spaced cavities or depressions 81 for receiving the balls 66 on the chain 64, when the chain 64 is mounted in a continuous loop about a pair of wheels 80 mounted in end caps 13 and 15 on each of the side rails 12 and 14.

Referring now to FIG. 5, the drive means of the present invention, in one embodiment, includes an electric drive motor 100 which is fixedly mounted in the stationary cross rail 18. The drive motor 100 has at least one and preferably a pair of oppositely extending, rotatable output shafts 102 and 104. By way of example, a DCPM gear motor, type D40, manufactured by the Barber-Colman Company, Rockford, Ill. may be employed as the drive motor 100. Suitable control wires, not shown, extend from the motor 100 to a power source, such as the vehicle battery, as well as to a control switch having two positions, i.e., forward and reverse. The control switch reverses the polarity of electric power supplied to the motor 100 thereby enabling the output shafts 102 and 104 to be co-axially rotated in one of two opposed directions, as desired to reposition the movable cross rail 16 to a desired longitudinal position on the body panel 11 with respect to the stationary cross rail 18.

A flexible, rotatable connector 106 connects the output shaft 102 to the rotatable wheel 80 in the side rail 12. A similar flexible, rotatable connector 106 also connects the output shaft 104 to the wheel 80 in the opposed side rail 14 as shown in FIG. 5. Any flexible connector 106 may be employed which is capable of transmitting rotation of the output shaft 102 or 104 to rotation of the associated rotatable wheel 80 despite any offset between the rotational axes of the motor 102 and the wheel 80.

By way of example only, the flexible connector 106 is in the form of a flexible shaft manufactured by SDP, Catalog Nos. A 7Z-11 or A 7C-11. Such a flexible shaft has an end fitting 108 which engages the rotatable output shaft 102 of the motor 100 and is fixed in place by means of a set screw. At the other end of the flexible shaft or connector 106, a fitting having a D or square shape extends into engagement with a correspondingly formed D or square shaped bore in the wheel 80 to interconnect the flexible shaft 106 to the wheel 80 for simultaneous rotation. The flexible connector 106 has an outer housing 112 which surrounds an internally disposed, flexible shaft or cable, not shown, extending between the end fittings.

In operation, when the motor control switch is activated, electric power is supplied to the motor 100 causing the output shafts 102 and 104 to simultaneously rotate in one direction. Such rotation is transmitted by the flexible connectors 106 to each of the wheels 80 in the side rails 12 and 14. Rotation of the wheels 80 results in longitudinal movement of both drive members or chains 64, with an upper portion of each chain 64, which passes through the upper bore 43 in the side rails 12 or 14 moving in one direction and a lower portion of each chain 64 which passes through the bore 41 in the side rails 12 or 14 and which engages the shuttle cleat 50 moving in an opposite direction. Since the lower portion of each drive member or chain 64 is fixedly secured to one of the shuttle cleats 62, as described above, each shuttle cleat 50 moves with movement of the lower portion of the chain 64 thereby resulting in simultaneous driving movement of both ends 20 and 22 of the cross rail 16. Since both wheels 80 and the drive members or chains 64 are moved simultaneously, both ends 20 and 22 of the movable cross rail 16 likewise move in unison thereby maintaining the cross rail 16 substantially perpendicular to the side rails 12 and 14. The control switch to the motor 100 is released when the movable cross rail 16 has reached the desired position with respect to the fixed cross rail 18.

Figure 6:
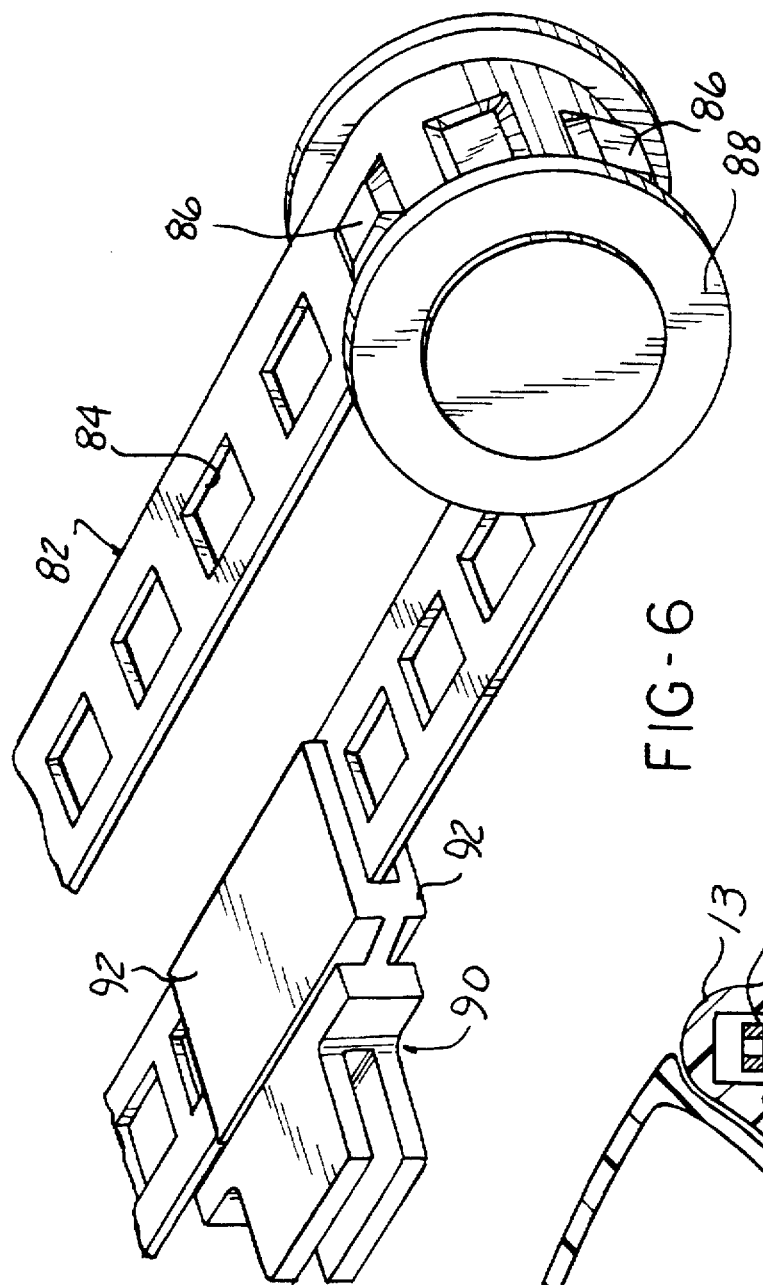
FIG. 6 is a partial, perspective view showing another embodiment of the means for adjusting the position of the movable cross rail.
Figure 7:
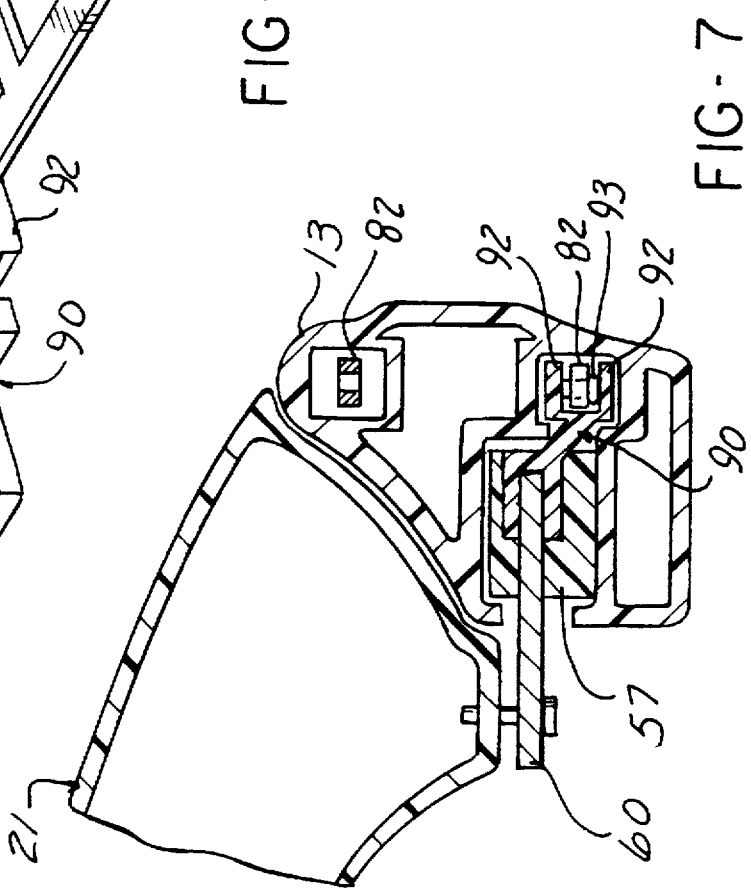
FIG. 7 is a partial, cross sectional view showing another embodiment of the adjusting means.

Referring briefly to FIGS. 6 and 7, there is depicted an alternate embodiment of the drive member which is denoted by reference number 82. In this embodiment, the drive member 82 is formed of a continuous belt having a plurality of spaced apertures 84 formed therein. The apertures 84 are engaged by circumferentially spaced projections 86 formed on a rotatable wheel 88 which is rotatably mounted in each end cap 13 and 15 as described above and shown in FIG. 2. In this alternate embodiment, a shuttle cleat 90 has essentially the same shape as the shuttle cleat 50 shown in FIG. 3 except for a pair of legs 92 from one of which spaced projections 93 extend toward the opposite leg and which engage the apertures 84 in the belt 82 to fixedly couple the shuttle cleat 90 to the drive belt 82. The apertures 84 in the drive member belt 82 and the projections 86 in each wheel 88 are complimentary to each other. The apertures 84 may be polygonal, such as the square shape shown in FIG. 6, or have other shapes such as circular, etc.

Figure 8:
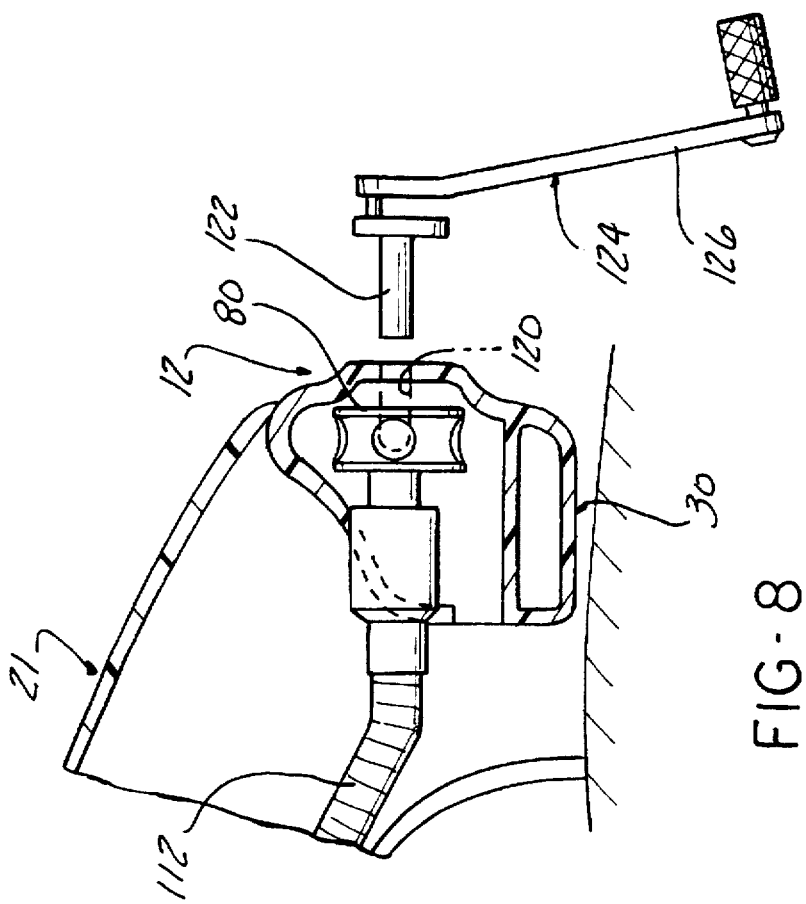
FIG. 8 is a cross sectional view taken through the side rail in the embodiment shown in FIG. 7.

Another embodiment of the drive means of the article carrier 10 of the present invention is shown in FIG. 8. In this embodiment, one rotatable wheel 80, as described above, is mounted in each end cap 13 and 15 at opposite ends of each side rail 12 and 14, with only the wheel 80 at one end of the side rail 12 being shown in FIG. 8. A bore 120 is formed in the wheel 80 and has a square or D shape for receiving a correspondingly formed square or D-shaped rod 122 on a crank 124. A crank handle 126 is fixedly connected to the rod 122 such that rotation of the crank handle 126 results in rotation of the rod 122 and a corresponding rotation of the wheel 80 and movement of the drive member or chain 64 as described above to reposition the movable cross rail 16 with respect to the fixed cross rail 18. The crank 124 may be permanently attached to the wheel 80 or removably mounted therein as shown in FIG. 8.

In this embodiment, the end fitting on the flexible connector 106 is fixed to the wheel 80. The connector 106 extends to the wheel 80 in the opposed side rail 14 to transmit rotation of wheel 80 by the crank 124 simultaneously and equally to the opposed wheel 80 for even adjustment of the cross rail 16 along the side rails 12 and 14. The flexible connector 106 may be rotatably anchored in the cross rail 16 or extends through a bore in an otherwise solid cross rail 16.

Figure 9B:
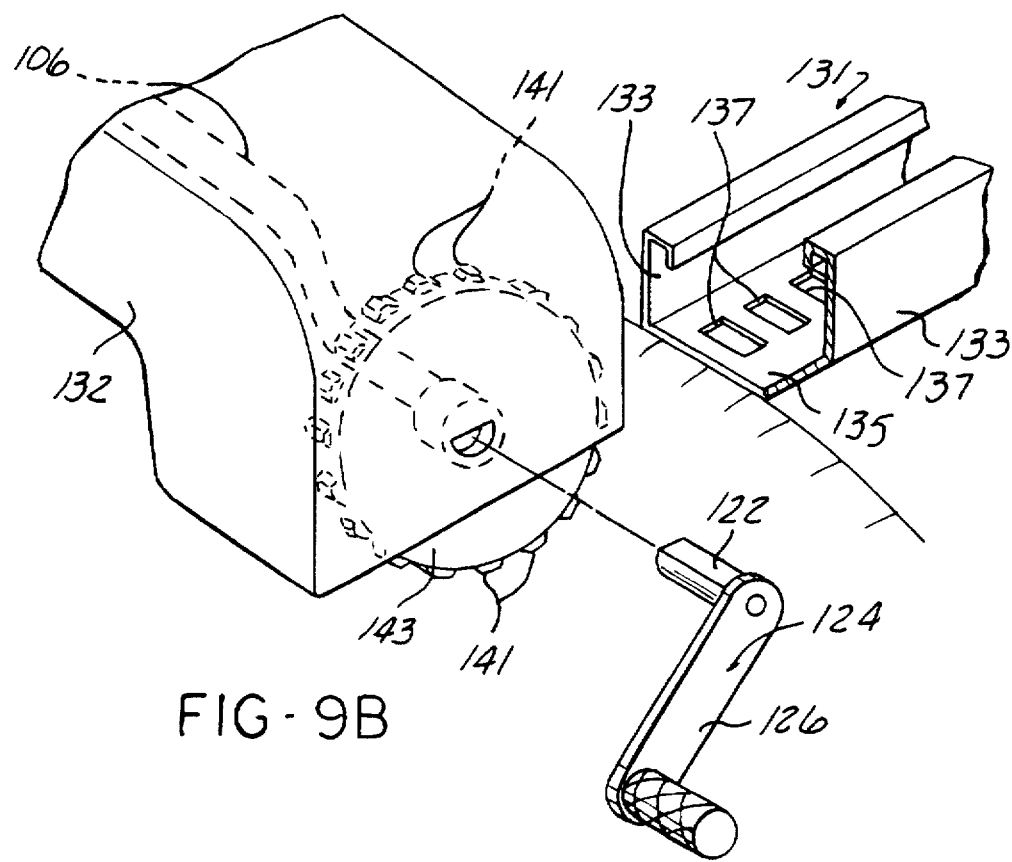
FIG. 9B depicts a modification to the embodiment shown in FIG. 9A.
Figure 9A:
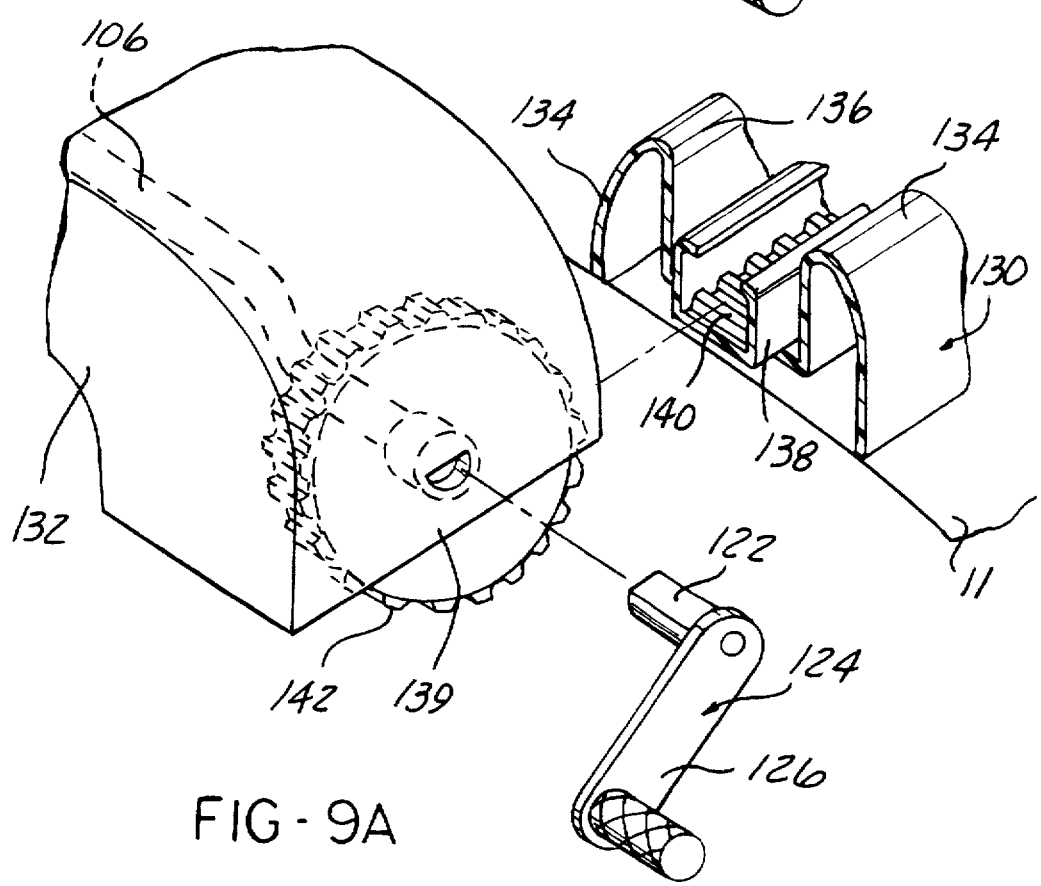
FIG. 9A is a partial, exploded, perspective view of another embodiment of the adjusting means.

Referring now to FIG. 9A, there is depicted another embodiment of an article carrier constructed in accordance with the teachings of the present invention. Although only one side rail 130 and one end of a movable cross rail 132 are shown in FIG. 9A, it will be understood that the other end of the cross rail 132 slidably engages a opposed side rail identically constructed to the side rail 130.

As shown in FIG. 9A, the side rail 130, by way of example only, is formed with generally arcuate shaped outer side walls 134. A depending, generally U-shaped channel 136 is formed between the side walls 134. A rack 138 is fixedly mounted in the channel 136 and has a plurality of spaced teeth formed on one surface, such as the bottom surface thereof.

In this embodiment, the rotatable wheel 139 mounted at one end of the movable cross rail 132 has a complimentary formed arrangement of externally extending teeth 142 which are engagable with the teeth 140 in the support 138. The wheel 139 is mounted at the end of the movable cross rail 132 and depends downward therefrom through a slot formed in the rack 138 to bring the teeth 142 on the wheel 139 into engagement with the teeth 140 formed on the bottom surface of the rack 138.

A crank 124, as described above, is permanently mounted in or removably insertable into the bore 120 in the wheel 139 to provide for manual rotation of the wheel 139 in either of two directions about the axis of rotation of the wheel 139. During such rotation, the teeth 142 on the wheel 139 engage the teeth 140 in the rack 138 mounted in the side rail 130 to enable adjustable positioning of the movable cross rail 132 along the side rails 130.

A flexible connector 106 extends between the wheel 139 at each end of the cross rail 132 to transmit equal rotation to each wheel 139 upon rotative motion imparted by the crank 124 to one wheel 139. This drive means may also be employed in two or all of the cross rails on the article carrier for added repositioning capability.

A suitable latch may be mounted on the cross rail 132 to releasibly latch or lock the movable cross rail 132 in a desired position. The latch is released to enable manual adjustment of the position of the movable cross rail 132 via the crank 124 and the wheel 139.

Although not shown, the crank 124 in the embodiments shown in FIGS. 8 and 9 can be replaced with a power screwdriver or similar power tool which has a bit sized to engage the bore in the wheel 139.

FIG. 9B depicts a modification to the embodiment shown in FIG. 9A. In this embodiment, the side rail 131 is formed with a central, longitudinally extending recess formed by spaced side walls 133 and a base 135. A series of spaced apertures 137, of any shape such as rectangular, circular, etc., are formed in the base 135. The apertures 137 are engaged by complementary projections 141 formed on a rotatable wheel 143 mounted in the end of the movable cross rail 132 to control the movement of the cross rail 32 along the side rail 131. A connector 106 connects the wheels 142 at opposite ends of the cross rail 132.

Figure 10:
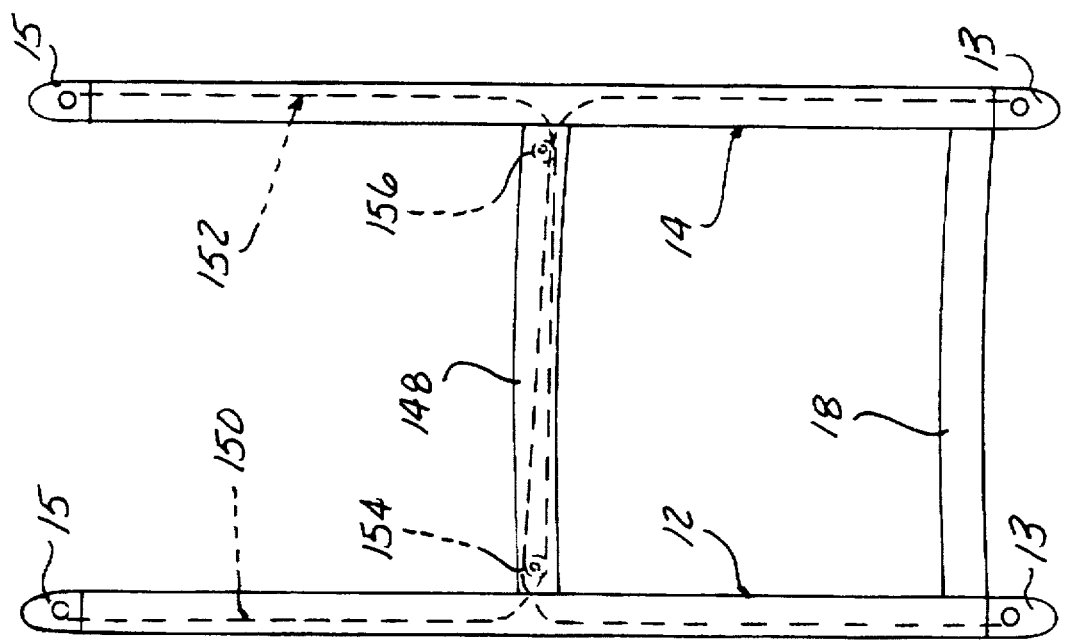
FIG. 10 is a plan view of another embodiment of the article carrier.

Another embodiment of the present article carrier is shown in FIG. 10. In this embodiment, substantially parallel movement of a movable cross rail 148 with respect to the fixed cross rail 18 is obtained by a pair of cables 150 and 152 which extend through the interior of the side rails 12 and 14 and the movable cross rail 148 which has a hollow cavity formed therein. A longitudinally extending slot is formed in each side rail 12 and 14, not shown, for passage of the cables 150 and 152 to the cross rail 148.

Double pulleys or guide members 154 and 156 are mounted on opposite ends of the movable cross rail 148 and slidably receive the cables 150 and 152 thereabout.

As shown in FIG. 10, a first end of the cable 150 is fixedly mounted in the end cap 15 on the side rail 12. The cable 150 extends from the fixed connection in end cap 15 about the pulley 154 and then about the pulley 156 to a fixed connection in the end cap 13 on the opposite side rail 14. Cable 152 is similarly disposed with a fixed connection at a first end diagonally opposite the end cap 15. The cable 150 extends from the fixed connection in the end cap 15 about the pulley 156, through the cross rail 148 and then about the pulley 154 to a fixed connection at a second end in the diagonally opposite end cap 13 on the side rail 12.

Due to the crossed relationship of the cables 150 and 152, the cross rail 148 remains substantially perpendicular to the side rails 12 and 14 during all manual repositioning thereof.

Figure 12A:
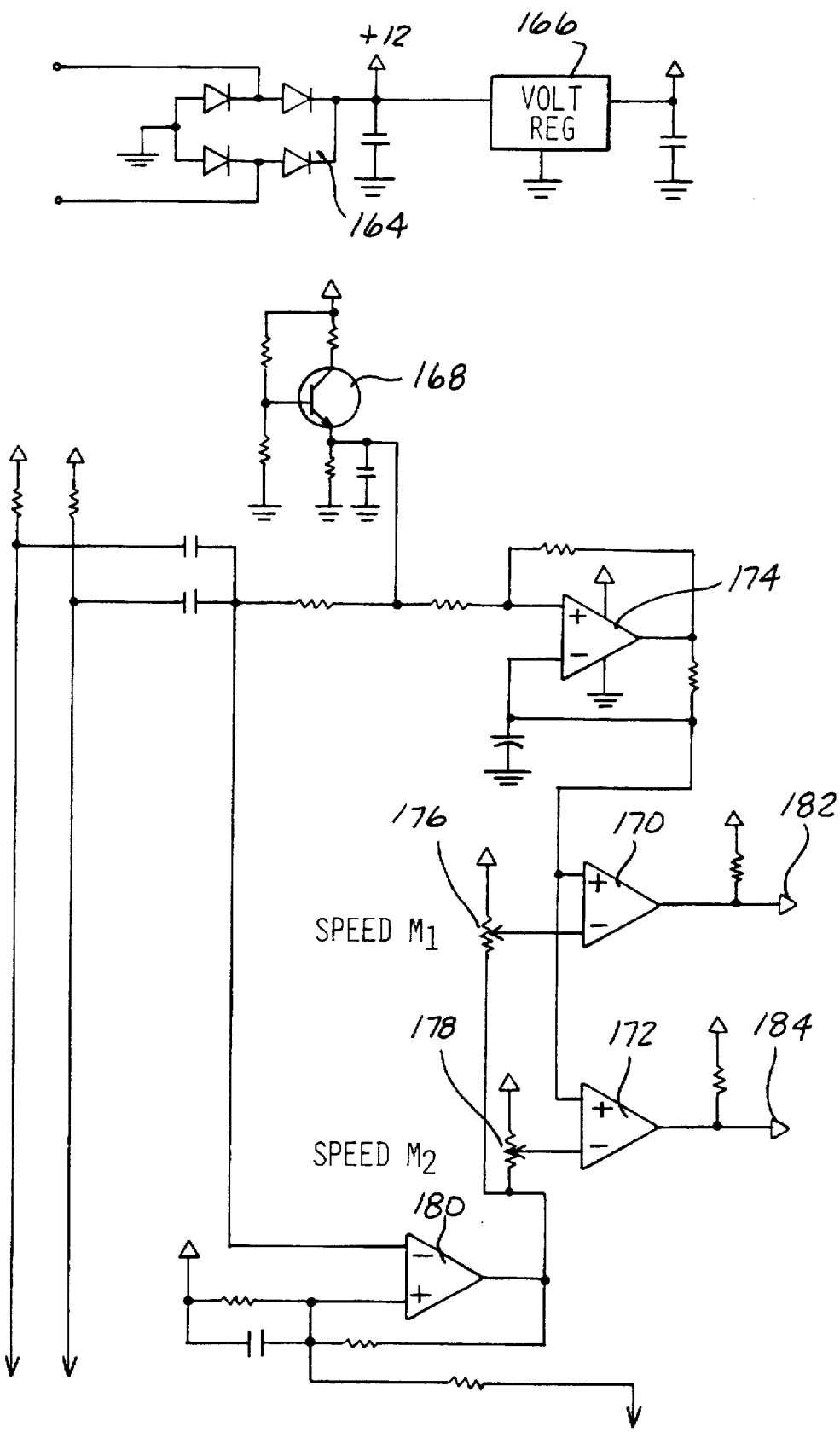
FIGS. 12A and 12B are circuit diagrams of motor control circuitry used with the embodiment shown in FIG. 11.
Figure 12B:
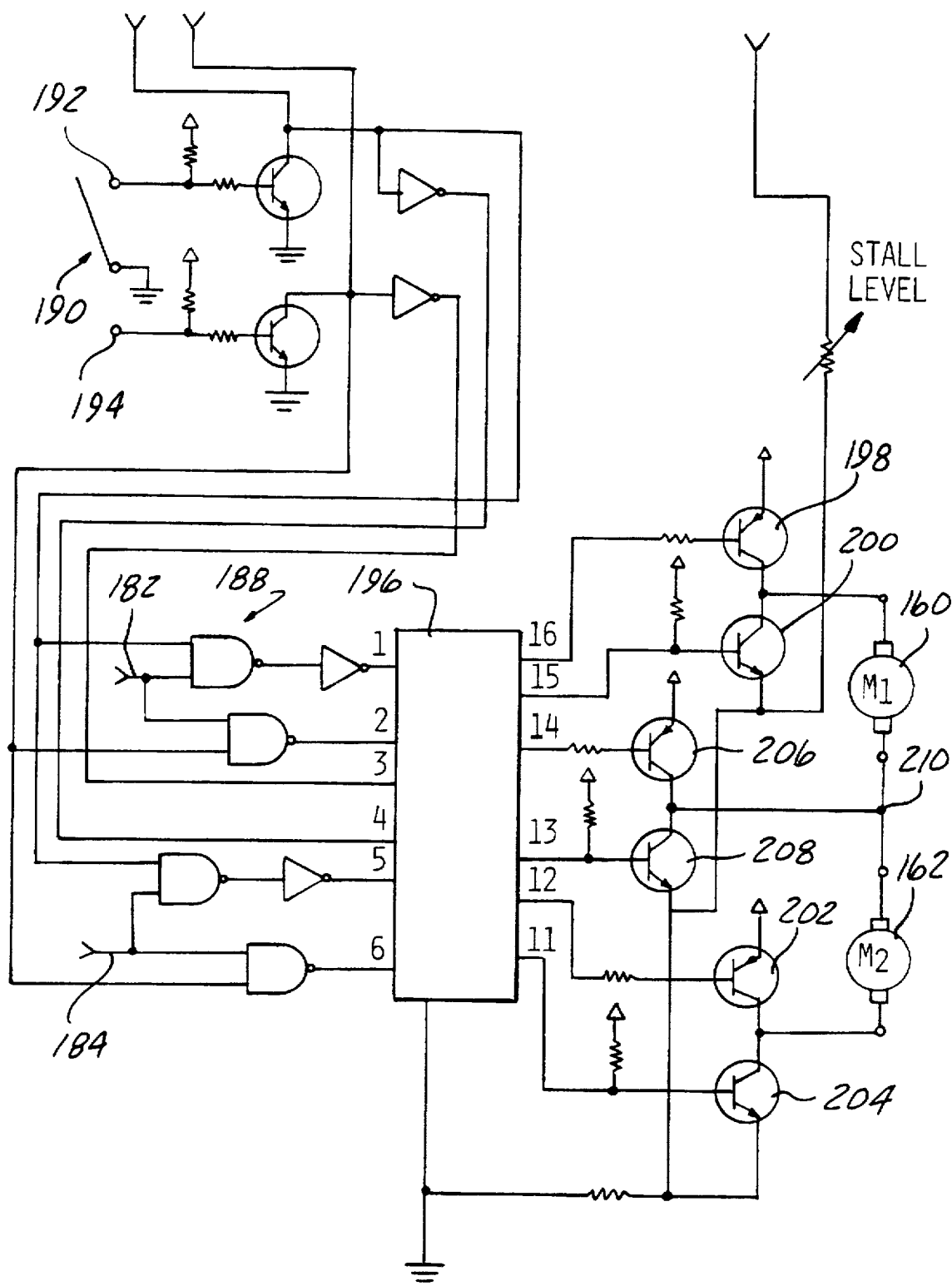

Referring now to FIGS. 11, 12A and 12B, there is depicted another embodiment of the present article carrier. In this embodiment, a rotatable member 80, as described above, is mounted into each end cap 13 associated with the stationary cross rail 18 and connected to any of the drive means described above for moving a movable cross rail 16 along the pair of side rails 12 and 14.

In this embodiment, a pair of motors 160 and 162 are mounted on opposite ends of the cross rail 18 and have their respective output shafts fixedly connected to one of the rotatable members 80 for bidirectionally rotating the rotatable member 80.

FIGS. 12A and 12B depict a motor control circuit used to operate and synchronize the rotation of the output shafts of the motors 160 and 162. As shown in FIG. 12A, input power from a suitable electric power source, such as a vehicle battery, is supplied to a bridge rectifier 164. The output of the bridge rectifier 164 is input to a voltage regulator 166 which supplies +5 volt power to the motor control circuitry.

A biased transistor 168 provides a reference voltage for an operational amplifier 174.

The amplifier 174 is connected with positive feedback to act as an oscillator at 20 KHz which provides a pulse width modulated triangular wave signal to the positive inputs of the comparators 170 and 172. The negative input of the comparators 170 and 172 receives a variable resistance provided by potentiometers 176 and 178, respectively. The variable resistance or potentiometers 176 and 178 provides a selective speed signal for the respective motors 160 and 162 which, in a preferred embodiment, is identical or adjusted for motor output variations to provide equal rotation of the output shafts of the motors 160 and 162. Power is supplied to the variable resistors 176 and 178 from an integrator 180 which sums the current drawn by the motors 160 and 162 over time. When the summed current exceeds a predetermined maximum, which is indicative of a stall condition, one or both of the outputs of the comparators 170 and 172 will go high and provide an output signal on respective output leads 182 and 184 to a logic circuit denoted generally by reference number 188 in FIG. 12B.

As shown in FIG. 12B, an input selector switch 190 is mountable at a suitable location in the vehicle or on the article carrier 10. The switch 190 is, by way of example, a single pole, double throw switch which is selectively connectible to contacts 192 and 194 which correspond to opposite directions of rotation of the output shafts of the motors 160 and 162 to move the movable cross rail in either forward or rearward directions along the side rails 12 and 14. The contacts 192 and 194 are connected to various NAND gates in the logic circuit 188 along with the stall signals 182 and 184 from the comparators 170 and 172 to provide inputs to a Darlington array 196, model No. ULN2003. The Darlington array 196 provides selective outputs to a plurality of pairs of transistors arranged in a conventional push-pull amplifier arrangement. Specifically, a first pair of outputs from the Darlington array 196 is input to the bases of transistors 198 and 200 which provide current to the first motor 160. Another pair of outputs from the Darlington array 196 is connected to the bases of transistors 202 and 204 to provide current to the second motor 162. A third pair of outputs from the Darlington array 196 controls transistors 206 and 208 which are connected to a common connection 210 on each of the motors 160 and 162.

In this manner, depending upon which contact 192 and 194 is closed or grounded by movement of the switch 190, current is supplied to both motors 160 and 162 of an appropriate polarity to cause the output shafts of the motors 160 and 162 to rotate in one direction corresponding to the made contact 192 or 194.

If a stall or overcurrent condition is detected by the integrator 180, one or both of the outputs 182 and 184 of the comparators 170 and 172 will go high thereby switching the outputs of the Darlington array 196 off through the logic circuit 188 to deactivate the motors 160 and 162. The selector switch 190 must then be turned off and then on again to reenergize the motors 160 and 162.

In summary, there has been disclosed a unique article carrier for vehicles which maintains a movable cross rail substantially perpendicular to the side rails during longitudinal repositioning of the movable cross rail. In one embodiment, the article carrier is provided with a unique powered drive means which drives the movable cross rail to a desired longitudinal position with respect to the fixed cross rail when the drive means is activated. The drive means is also provided in a manual version via a rotatable crank handle or through the use of a power tool, such as a power screwdriver, having a rotatable output shaft or bit.

What is claimed is:

1. A vehicle article carrier comprising:
    a pair of spaced side rails mounted on and extending longitudinally along a vehicle body surface, an interior cavity extending longitudinally through each side rail;
    a movable cross rail slidably mounted on the side rails and movably positionable along the side rails; and
    means, mounted in the side rails and coupled to the movable cross rail, for longitudinally adjusting the position of the movable cross rail longitudinally along the side rails while maintaining the movable cross rail substantially perpendicular to the side rails.

2. The vehicle article carrier of claim 1 wherein the adjusting position means comprises:
    a pair of longitudinally spaced rotatable members mounted in each side rail;
    a drive member movably extending between the rotatable members;
    a shuttle cleat movably mounted within each side rail;
    means for coupling the drive member in each side rail to each shuttle cleat; and
    means for rotating at least one rotatable member in each side rail in unison to bidirectionally move the drive members causing adjustable positioning of the movable cross bar along the side rails.

3. The vehicle article carrier of claim 2 wherein the rotating means comprises:
    an electric motor having at least one bidirectional rotatable output shaft; and
    connector means, connected to the output shaft of the motor and one rotatable member in one of the side rails, for transmitting rotation of the output shaft of the motor to rotation of the one rotatable member.

4. The vehicle article carrier of claim 3 wherein:
    a fixed cross rail is stationarily mounted on the pair of side rails; and
    the electric motor is mounted in the fixed cross rail.

5. The vehicle article carrier of claim 3 wherein:
    the electric motor has two oppositely extending rotatable output shafts; and
    the connector means is connected to and extends from each output shaft to one rotatable member in each side rail.

6. The vehicle article carrier of claim 3 wherein the connector means comprises:
    a flexible rotatable cable; and
    end connections mounted at opposite ends of the cable and engagable with the output shaft of the motor and one rotatable member.

7. The vehicle article carrier of claim 2 wherein the rotating means comprises:
    manual crank means connectible to at least one rotatable member.

8. The vehicle article carrier of claim 7 wherein:
    the crank means is releasibly connectible to the one rotatable member.

9. The vehicle article carrier of claim 2 wherein the rotating means comprises:
    a bidirectionally rotatable power tool releasibly connectible to one rotatable member.

10. The vehicle article carrier of claim 2 wherein the drive member comprises:
    a continuous member arranged in a loop about the pair of rotatable members in each side rail and having a plurality of spaced projections formed thereon;

the shuttle cleat including means for engaging the spaced projections.

11. The vehicle article carrier of claim 10 wherein the drive member comprises:

a chain formed of a plurality of balls interconnected by stems.

12. The vehicle article carrier of claim 11 wherein the means for coupling the drive member to the shuttle cleat comprises:

means, carried on the shuttle cleat, for engaging the balls and stems of the chain.

13. The vehicle article carrier of claim 2 wherein the drive member comprises:

a continuous belt having a plurality of longitudinally spaced apertures formed therein; and the shuttle cleat including means having at least one projection engagable with one of the apertures in the belt.

14. The vehicle article carrier of claim 2 wherein the rotating means comprises:

first and second electric motors, each having a bi-directionally rotatable output shaft connected to one rotatable member in each side rail, the first and second electric motors simultaneously activated to equally rotate the rotatable members.

15. The vehicle article carrier of claim 2 wherein the rotating means comprises:

a pair of electric motors, each having a bidirectional rotatable output shaft connected to one of the rotatable members; and means for activating the pair of electric motors in unison.

16. A vehicle article carrier comprising:

a pair of spaced side rails mounted on and extending longitudinally along a vehicle body surface, an interior cavity extending longitudinally through each side rail;

a pair of rotatable members longitudinally spaced and mounted in each side rail;

a movable cross rail slidably mounted on the side rails and movably positionable along the pair of side rails;

a drive member extending between the pair of rotatable members in each side rail;

a shuttle cleat movably mounted within each side rail;

means for coupling the drive member to each shuttle cleat in each side rail;

means for rotating the rotatable members in each of the side rails to linearly move the drive member causing adjustable positioning of the movable cross rail along the pair of side rails, the rotating means including:

an electric motor having at least one bidirectional rotatable output shaft; and connector means, fixedly connected to the output shaft of the motor and one rotatable member in one of the side rails, for transmitting rotation of the output shaft of the motor to rotation of the one rotatable member.

17. A vehicle article carrier comprising:

a pair of spaced side rails mounted on and extending longitudinally along a vehicle body surface, an interior cavity extending longitudinally through each side rail;

a movable cross rail slidably mounted on and extending between the pair of side rails;

a rotatable member mounted at each end of the movable cross rail and having circumferentially spaced projections formed on a peripheral end thereof;

a shaft connecting the rotatable members at each end of the movable cross rail;

means, complementary shaped to the projections on the rotatable member and carried in each side rail, for cooperative engagement with the rotatable member; and means, connectible to at least one of the rotatable members, for imparting rotation to the at least one rotatable member and thereby to the movable cross rail and the opposed rotatable member whereby rotation of the rotatable members causes movement of the movable cross rail along the pair of side rails.

18. The vehicle article carrier of claim 17 wherein the rotating means comprises:

manual crank means connectible to at least one rotatable member.

19. The vehicle article carrier of claim 17 wherein:

the projections on the rotatable member are gear teeth; and the cooperative engagement means in each side rail are mating gear teeth arranged in a longitudinally extending rack.

20. The vehicle article carrier of claim 17 wherein the cooperative engagement means comprises:

a plurality of spaced apertures carried in each side rail and having a complementary shape to the projections on each rotatable member.

21. A vehicle article carrier comprising:

a pair of spaced side rails mounted on and extending longitudinally along a vehicle body surface, an interior cavity extending longitudinally through each side rail;

a movable cross rail slidably mounted on and extending between the pair of side rails;

guide members mounted at opposite ends of the movable cross rail;

a first cable having first and second opposed ends;

a second cable having first and second opposed ends;

the first cable connected at a first end to one end of one side wall and passing about the guide members in the movable cross rail to a fixed connection at the second end to a diagonally opposed end of the other side rail; and the second cable connected at a first end to one end of the other side rail and passing about the guide members in the movable cross rail to a fixed connection at a second end to a diagonally opposed end of the one side rail.

* * * * *